(12) United States Patent
Vromman et al.

(10) Patent No.: US 11,913,150 B2
(45) Date of Patent: Feb. 27, 2024

(54) NON-WOVEN STRUCTURE WITH FIBERS CATALYZED BY A METALLOCENE CATALYST

(71) Applicant: Beaulieu International Group NV, Waregem (BE)

(72) Inventors: Tim Vromman, Lede (BE); Daan De Keyzer, Waregem (BE)

(73) Assignee: Beaulieu International Group NV (BE)

( * ) Notice: Subject to any disclaimer, the term of this patent is extended or adjusted under 35 U.S.C. 154(b) by 223 days.

(21) Appl. No.: 16/087,373

(22) PCT Filed: Mar. 17, 2017

(86) PCT No.: PCT/EP2017/056438
§ 371 (c)(1),
(2) Date: Sep. 21, 2018

(87) PCT Pub. No.: WO2017/162540
PCT Pub. Date: Sep. 28, 2017

(65) Prior Publication Data
US 2020/0157716 A1    May 21, 2020

(30) Foreign Application Priority Data
Mar. 24, 2016 (BE) .................... 2016/5213

(51) Int. Cl.
*D06N 7/00* (2006.01)
*D04H 1/544* (2012.01)
(Continued)

(52) U.S. Cl.
CPC .......... *D04H 1/488* (2013.01); *D04H 1/4291* (2013.01); *D04H 1/435* (2013.01); *D04H 1/4334* (2013.01);
(Continued)

(58) Field of Classification Search
CPC ......... D06N 7/0068; D06N 2201/0254; D06N 2201/10; D04H 1/5412; D04H 1/5418;
(Continued)

(56) References Cited

U.S. PATENT DOCUMENTS 5,993,964 A * 11/1999 Nakajima ............... D04H 3/007
526/348
6,849,565 B1 * 2/2005 Gardner ................. D05C 17/02
442/35
(Continued)

FOREIGN PATENT DOCUMENTS

CN    1628190 A    6/2005
CN    1732294 A    2/2006
(Continued)

OTHER PUBLICATIONS

Moody, Von Needles, Howard L.. (2004). Tufted Carpet—Textile Fibers, Dyes, Finishes, and Processes—6.1.2 Loop Pile Created by Tufting. William Andrew Publishing. Retrieved from https://app.knovel.com/hotlink/pdf/id:kt003IHEW1/tufted-carpet-textile/loop-pile-created-by (Year: 2004).*
(Continued)

*Primary Examiner* — Larissa Rowe Emrich
(74) *Attorney, Agent, or Firm* — Buchanan Ingersoll & Rooney PC

(57) ABSTRACT

A bonded and entangled non-woven structure made of at least 50% staple fibers by weight of the bonded and entangled non-woven structure, and at least a partial bonding of the fibers of the non-woven structure. The at least partial bonding including thermally activated bonds between a first polyolefin material produced with a catalyst including at least one metallocene catalyst and having a melting point in the range 130-170° C. and a second material having a melting point which is at least 10° C. higher than the melting point of the first material, the weight of the first material in
(Continued)

the non-woven structure being at least 3% of the weight of the nonwoven structure.

7 Claims, 2 Drawing Sheets

(51) Int. Cl.
*D04H 1/541* (2012.01)
*D04H 1/488* (2012.01)
*D04H 1/4291* (2012.01)
*D04H 1/4334* (2012.01)
*D04H 1/435* (2012.01)

(52) U.S. Cl.
CPC ........... *D04H 1/544* (2013.01); *D04H 1/5412* (2020.05); *D04H 1/5418* (2020.05); *D06N 7/0068* (2013.01); *D06N 2201/0254* (2013.01); *D06N 2201/0263* (2013.01); *D06N 2201/10* (2013.01); *D06N 2205/18* (2013.01)

(58) Field of Classification Search
CPC .. D04H 1/544; D04H 1/4291; D04H 1/43828; D04H 1/43835; D10B 2503/04; D10B 2321/021; D10B 2321/022; D01F 8/06
See application file for complete search history.

(56) References Cited

U.S. PATENT DOCUMENTS

| | | | |
|---|---|---|---|
| 7,491,770 B2 | 2/2009 | Autran et al. | |
| 7,968,481 B2 | 6/2011 | Matsui et al. | |
| 2002/0034635 A1* | 3/2002 | Terada | D01F 8/06 428/365 |
| 2003/0015282 A1* | 1/2003 | Reisdorf | D04H 1/48 156/244.11 |
| 2005/0142325 A1* | 6/2005 | Veurink | D04H 3/007 428/95 |
| 2005/0165173 A1* | 7/2005 | Autran | D04H 1/541 525/333.7 |
| 2006/0223405 A1* | 10/2006 | Pourdeyhimi | D04H 3/14 442/361 |
| 2007/0172630 A1* | 7/2007 | Jones | B32B 5/06 428/95 |
| 2010/0047571 A1* | 2/2010 | Bieser | D01D 5/0985 428/373 |
| 2010/0233927 A1* | 9/2010 | Standaert | D01F 6/46 524/451 |
| 2015/0017867 A1* | 1/2015 | Schroer | D04H 3/007 442/364 |
| 2016/0115630 A1 | 4/2016 | Kubota et al. | |

FOREIGN PATENT DOCUMENTS

| | | | | |
|---|---|---|---|---|
| CN | 104095505 A | | 10/2014 | |
| CN | 105283589 A | | 1/2016 | |
| EP | 0518690 A1 | * | 12/1992 | ........... D06N 7/0068 |
| EP | 0990730 A2 | * | 4/2000 | .............. B32B 5/06 |
| EP | 2034056 A1 | | 3/2009 | |
| WO | 0132976 A1 | | 5/2001 | |
| WO | 2012126973 A1 | | 9/2012 | |

OTHER PUBLICATIONS

Shamiri A, Chakrabarti MH, et al. The Influence of Ziegler-Natta and Metallocene Catalysts on Polyolefin Structure, Properties, and Processing Ability. Materials (Basel). Jul. 9, 2014;7(7):5069-5108. doi: 10.3390/ma7075069. PMID: 28788120; PMCID: PMC5455813 (Year: 2014).*
European Communication pursuant to Article 94(3) for European Application No. 17 716 139.5, dated Oct. 24, 2019, 6 pages.
International Search Report and Written Opinion for International Application No. PCT/EP2017/056438, dated May 16, 2017—9 pages.
International Preliminary Report on Patentability and Written Opinion for International Application No. PCT/EP2017/056438, dated Sep. 25, 2018, 6 pages.
Chinese Office Action for Chinese Application No. 201780019507.3, dated Oct. 27, 2020, with translation, 18 pages.

* cited by examiner

Side-by-side  Sheath-core  Segmented pie

Islands-in-the-sea  Tipped  Segmented ribbon

NON-WOVEN STRUCTURE WITH FIBERS CATALYZED BY A METALLOCENE CATALYST

CROSS-REFERENCE TO RELATED APPLICATIONS

This patent application is a U.S. National Phase Patent Application of PCT Application No.: PCT/EP2017/056438, filed Mar. 17, 2017, which claims priority to Belgium Patent Application No. 2016/5213, filed Mar. 24, 2016, each of which is incorporated by reference herein in its entirety.

FIELD OF THE INVENTION

The present invention relates to bonded and entangled non-woven structures for use, for example, in hygiene and health care, such as in disposable or single use products for use, for example in hospitals, schools, and domestically, in diapers or wipes, but also in carpets. The present invention also relates to methods of making such bonded and entangled non-woven structures.

BACKGROUND OF THE INVENTION

A non-woven structure is a fabric-like material made from fibers, e.g. bonded by chemical, mechanical, heat or solvent treatment, which are neither woven nor knitted.

A textile floor covering is known being a needled non-woven structure which can be flat or have a structured surface or can be tufted and can be used as a temporary (e.g. single use, or limited duration) floor covering or carpet in trade fairs, congresses and other events, or can be for long term use, e.g. in contract or industrial carpets, or domestic carpets. Such a carpet can have a pile portion comprising pile fibers in a needle punched non-woven fabric. A primary backing can be applied. Alternatively or additionally, a latex can be used to impregnate the back surface of the carpet and can be used as a bonding agent.

There is an interest to supply polymeric based products with minimal effect on the environment. There are four major options for disposal of plastics: landfilling, incineration, recycling, and biodegradation. Plastics are used for single-use disposable applications, such as packaging, agricultural films and disposable consumer items, for long-term infrastructure such as pipes, cable coatings and structural materials, and for durable consumer applications with intermediate lifespan, such as in electronic goods, furniture, carpets, vehicles, etc.

It is hoped that recycling can be used to reduce plastic waste, oil usage and carbon dioxide emissions. There are four categories of recycling:
a) Primary or closed-loop recycling, such as mechanical reprocessing into a product with equivalent properties,
b) secondary recycling downgrading such as mechanical reprocessing into products having less exacting properties,
c) tertiary or chemical or feedstock recycling when the polymer is de-polymerized to its chemical constituents or when biodegradable plastics are composted, and
d) quaternary recycling such as recovery of energy.

A wide variety of different polymers and other materials such as metals (e.g. clips), paper, pigments, inks and adhesives are used in polymeric based products. Primary recycling is most practical when the polymer materials can be separated easily from sources of contamination. Preferably, there should only be one or a very limited range of polymer grades in any one product if the aim is to recycle the product and to replace virgin materials with recycled materials. It is often not technically feasible to add recycled plastic materials to raw polymer without decreasing at least some quality attributes of the plastic such as color, clarity or mechanical properties such as impact strength. Hence, there is limited recycling of multi-layer/multi-component articles such as carpets because these result in contamination between polymer types such as contamination by incompatible polymers.

Hence, although recycling may be perceived as the best option, only a limited range of plastics can be recycled. Waste must be sorted thoroughly, which increases the cost. Contamination of different plastics streams results in lower quality materials. It is difficult if not impossible to produce recycled plastics of the same quality as virgin polymer because sorting systems are imperfect and the raw materials used to produce recycled product are impure. Although recycled polymers are cheaper to produce, their quality decreases due to contamination with each recycling cycle. Price of oil and of landfill disposal is not high enough to make use of recycled materials economical.

One potential way to reduce use of plastic in the first place is:
a) Omit parts of a carpet such as laminated materials or latexes. However, to omit such structural materials is accompanied with a reduction in various important properties of carpets such as the strength and stiffness of these carpets.
b) Increase the use of natural fibers or biodegradable fibers. Natural fibers contaminate the plastic materials. Biodegradable plastics tend to be too expensive.

SUMMARY OF THE INVENTION

The present invention provides in one aspect a bonded and entangled non-woven structure made of at least 50% staple fibers by weight of the bonded and entangled non-woven structure, and at least a partial bonding of the fibers of the non-woven structure, the at least partial bonding comprising thermally activated bonds between a first polyolefin material produced with a catalyst comprising at least one metallocene catalyst and having a melting point in the range of 130-170° C. (or 130-155° C.) and a second material having a melting point which is at least 10° C. higher than the melting point of the first material, the weight of the first material in the non-woven structure being at least 3% of the weight of the nonwoven structure.

The present invention provides in a further aspect a bonded and entangled non-woven structure made of at least 50% staple fibers by weight of the bonded and entangled non-woven structure, and at least a partial bonding of the fibers of the non-woven structure, the at least partial bonding comprising thermally activated bonds between fibers comprising a first polyolefin material produced with a catalyst comprising at least one metallocene catalyst and having a melting point in the range of 130-170° C. (or 130-155° C.), the weight of the first material in the non-woven structure being at least 3% of the weight of the nonwoven structure. These fibers can be bicomponent fibers.

The staple fibers can be solid or hollow, be round or shaped, e.g. multilobal such as trilobal.

Bonded and entangled nonwoven structures according to embodiments of the present invention can be used in fabrics to provide specific functions such as absorbency, liquid repellence, resilience, stretch, softness, strength, flame retardancy, washability, cushioning, thermal insulation, acoustic insulation, filtration, bacterial barrier and sterility.

In combination with other materials, bonded and entangled nonwoven structures according to embodiments of the present invention provide a spectrum of products with diverse properties, and can be used alone or as components of apparel (e.g. disposable clothing), home or event furnishings (e.g. carpets), health care (e.g. surgical drapes, gowns, covers, masks; wound dressings, engineering or industrial (e.g. geotextile; filtration; isolation; automotive components) and consumer goods (e.g. diapers, feminine hygiene products; tea/coffee bags).

In a preferred embodiment of the present invention, the bonded and entangled non-woven structure is used in carpets, wherein the nonwoven structure forms the facing layer of the carpet. In another preferred embodiment of the present invention, the bonded and entangled non-woven structure is used in an event carpet, wherein the non-woven structure forms the facing layer of the event carpet.

The bonded and entangled non-woven structure can be entangled by needled punching or by hydroentanglement.

The total staple fiber content can be at least 60%, preferably at least 70% and up to 100% by weight of the non-woven structure.

The bonded and entangled non-woven structure according to embodiments of the present invention preferably has a normalized stiffness higher than 150N/% as determined by a corrected stiffness derived from a tensile test according to EN ISO 13934-1 (see definitions section).

The second material can be selected from synthetic or natural materials. For example the second material can be selected from a polyolefin such as polyethylene or polypropylene, or can be a polyamide, or a polyester (e.g. PET).

At least the first or the second material can comprise polypropylene or a polypropylene copolymer.

The at least partial bonding is preferably a pressureless bonding made without pressuring the nonwoven structure during heating and thermal activation of bonds. This leaves the non-woven structure in an open state and compressible.

The fibers may be split between first staple fibers made of the first material and second staple fibers made of the second material. The amount of first fibers is between 3 and 30% of the total staple fiber content of the bonded and entangled non-woven structure.

The linear mass density of the first fibers is preferably lower than the linear mass density of the second fibers. For example the linear mass density of the second fibers can be at least 1.5 higher than the linear mass density of the first fibers.

The first and second materials can be included, together, in bicomponent fibers. The bicomponent fiber has at least some of the first material exposed on the surface of the fiber and is bonded to some of the second material of the same fiber. Preferably, the bicomponent fiber can be a sheath/core bicomponent fiber, wherein the first material is present in the sheath.

An advantage of bonded and entangled non-woven structures according to some embodiments of the present invention is a reduction weight and/or cost, while keeping or improving mechanical performance such as stiffness or modulus. An advantage of bonded and entangled non-woven structures according to some embodiments of the present invention is a low weight but a good coverage and abrasion resistance.

Bonded and entangled nonwoven structures according to embodiments of the present invention can be used in carpets, and can have a weight range between 100 and 1000 grams/square meter depending upon use. In some preferred embodiments the weight of the non-woven structure (base weight) is between 100 and 350 grams per square meter, for example more preferred between 150-275 grams per square meter. For weights and fibers for various products see definition section.

The bonded and entangled non-woven structure according to some embodiments of the present invention can be used as a facing layer or top layer of a carpet. In another aspect, the present invention provides a carpet comprising the bonded and entangled non-woven structure as defined above as a facing layer, optionally comprising a backing layer.

In such a carpet the staple fiber content of the facing layer can be at least 60%, at least 70%, at least 80% or at least 90% by weight of the bonded and entangled non-woven structure, preferably up to 100% by weight.

A backing layer is less preferred if it has a significant impact on the overall manufacturing cost or introduces different and incompatible polymers to the bonded and entangled non-woven structure. Instead of a separate backing layer, preferred embodiments of the present invention utilize pressureless inter-fiber thermally activated bonding. If a backing is used, e.g. simply to increase weight, then it is preferred if the backing can be stripped away easily if its presence would make recycling more difficult.

Carpets according to embodiments of the present invention have good coverage while having a low weight.

The facing layer of the carpet can be printed, e.g. preferably digitally printed so that the carpet can be customized to a customer requirement rather than stocking large quantities of pre-customized carpet. In accordance with embodiments of the present invention carpet can be stocked in a selection of standard colors, such as red, blue, green etc. and the final customized printing relates to specific designs or patterns applied onto the standard colored carpet.

Entangled and bonded nonwoven structures according to embodiments of the present invention can be needle punched and can be produced using an industrial scale needle punch carpet production line. For example, staple fibers are mixed and formed into a bat or mat using carding and cross-lapping. The mat can be pre-needled using plain barbed needles to form a carpet face layer. A carpet according to some embodiments of the present invention can be produced by first producing a needle punched non-woven structure as defined above and then bonding by passing the needle punched non-woven structure through an oven or an equivalent heating device, the temperature profile of the oven or other device being chosen in such a way that fibers keep some integrity after bonding. When first fibers of, or comprising the first material are bonded to second fibers of the second material, the second fibers substantially keep their original form possibly except at bonding points between the first and second fibers. It has been found that the oven is preferably an air circulating oven run at least 5° C. below the temperature at which the material of the second fibers melts. It is preferred that at least 50%, more preferably at least 60%, still more preferred if at least 75% of the fibers maintain their integrity after thermally activated bonding including, for example the fibers made of the first material.

In the carpet the first or the second material can comprise polypropylene or a polypropylene copolymer.

Carpet according to some embodiments of the present invention, can comprise a bonded and entangled non-woven structure having a weight of 100-350 grams per square meter, preferably between 150-275 grams per square meter e.g. for event carpet.

A carpet and other products according to some embodiments of the present invention is preferably 100% recyclable.

A technical advantage of carpets in accordance with embodiments of the present invention can be the mass homogeneity of a nonwoven facing layer.

Also the coverage (ability to prevent see-through) is good.

Another advantage is that a higher stiffness or modulus can be achieved with the same stitch density, needling efficiency effect, and a higher fiber-fiber friction can also be achieved compared to conventional non-woven structures, especially when using multilobal such as trilobal fiber.

An advantage of embodiments of the present invention can be a lower or no precoat weight of a backing material such as a latex, a lower or no absorption of precoat backing material leading to lower overall carpet weight and less problems with recycling. The effect of these differences can lead to significant lower weight of the end product. An advantage of embodiments of the present invention can be a lower end weight for other backing methods.

An advantage of embodiments of the present invention can be a lower carbon footprint compared to current versions.

The second fiber is preferably made of polypropylene (PP), polyamide or polyester (e.g. PET).

Another aspect of the present invention is a process for making a carpet having at least a bonded and entangled non-woven structure as a top layer made of staple fibers, wherein the staple fibers comprise at least 50% by weight of the top layer, the process comprising:
conveying a fibrous card web to a crosslapping machine and crosslapping the card web into a batt of material.

Another aspect of the present invention is a process for making a carpet having at least a bonded and entangled non-woven structure as a top layer made of staple fibers, wherein the staple fibers comprise at least 50% by weight of the top layer, the process comprising: conveying a fibrous card web to a crosslapping machine and crosslapping the card web into a batt of material comprising staple fibers made from a first polyolefin material produced with at least one catalyst being metallocene catalyst and having a melting point in the range of 130-170° C. (or 130-155° C.) and fibers made of a second material having a melting point which is at least 10° C. higher than the melting point of the first material, the weight of the first material in the non-woven structure being at least 3% of the weight of the nonwoven structure, and at least partially bonding the staple fibers of the non-woven structure by thermally activating bonds between the first and the second materials. The method preferably includes needle punching or hydroentanglement of the non-woven structure followed by the partial bonding preferably including passing the entangled non-woven structure through an oven or an equivalent heating device, the temperature profile of the oven or other device being chosen in such a way that fibers keep some integrity after bonding. When first fibers of the first material are bonded to second fibers of the second material, the second fibers substantially keep their original form possibly except at bonding points between first and second fibers. It has been found that the oven is preferably an air circulating oven run at least 5° C. below the temperature at which the material of the second fibers melts. It is preferred that at least 50%, more preferably at least 60%, still more preferred if at least 75% of the fibers maintain their integrity after thermally activated bonding, for example also for fibers having the first material.

Further embodiments of the invention are defined in the dependent claims.

DETAILED DESCRIPTION OF THE INVENTION

Definitions

Figure 1:
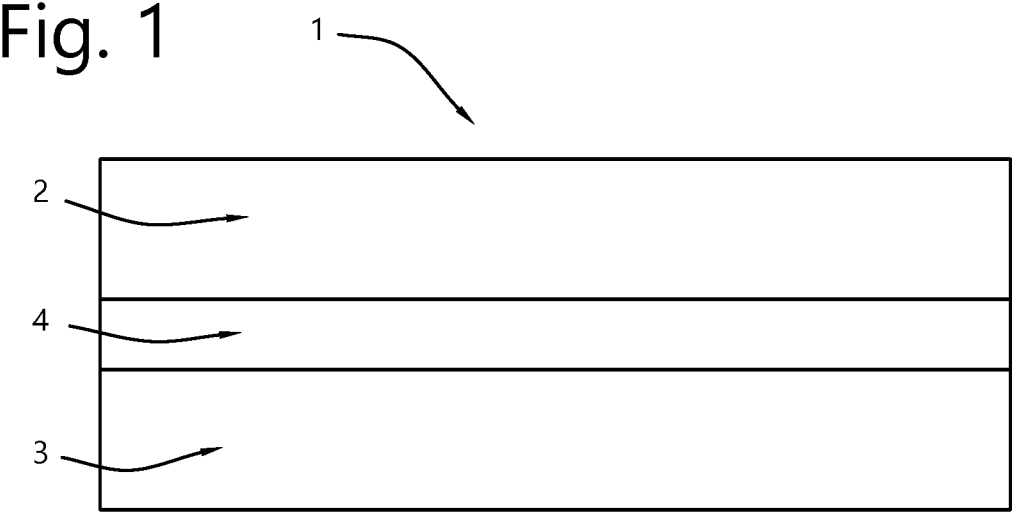
FIG. 1 shows a schematic cross-section of a carpet according to an embodiment of the present invention.

The terms "fiber" and "filament" refer to filamentous material that can be used in yarn fabric and non-woven textile fabrication. The term "staple" means fiber or yarn or strands of short and definite length, such as substantially between 20-120 mm, or between 50-80 mm.

A "non-woven" which can be used with the present invention may be a staple non-woven made by providing cut fibers of a few centimetres length, putting these into bales, placing on a conveyor belt and dispersed, e.g. spread in a uniform web by a wetlaid, airlaid, or carding/crosslapping process.

Preferred entanglement methods are:
needle punching (preferred method): mechanical intertwining of fibers by needles
hydro-entanglement: mechanical intertwining of fibers by high pressure water jets The following types of non-wovens are excluded from the nonwoven structure according to the present invention:
Spunlaid nonwovens made in one continuous process by spinning and then directly dispersing the fibers into a web by deflectors or can be directed with air streams.

Spunbonded non-wovens optionally combined with melt-blown nonwovens.

Non-wovens bonded as follows are less preferred:
use of a heat sealer
calendered through heated rollers (called spunbond when combined with spunlaid webs) belt calendered, or compressive belt heat bonded
ultrasonic pattern bonding.
chemical bonding processes: such as impregnation with powders, or latex emulsion or solution polymers to chemically join the fibers or use of powders that soften and melt.

A "needle felt" as used in embodiments of the present invention is a staple fiber based needle punched nonwoven. It is preferred if a separate backing such as a latex compound, or impregnation with a binder powder is not used. A strippable backing layer made by extrusion can be.

The term "needle punched" means a nonwoven which is consolidated by passing it though one or more needleboards carrying several thousands of needles that penetrate the nonwovens repeatedly, forming a mechanically entangled structure.

Keeping the "integrity" of fibers refers to maintaining structural integrity of a staple fiber, there being sufficient amount of an original fiber being present for structural integrity even if thinner than the original form and even if the cross-sectional form of the fiber is no longer similar to the original one. It is preferred that at least 50%, more preferably at least 60%, still more preferred if at least 75% of the fibers maintain their integrity after thermally activated bonding.

The term "carpet" refers to a textile structure including a non-woven structure according to embodiments of the present invention as a face layer. Less preferred is a carpet including a primary backing and, for example, on the underside of the primary backing one or more further layers of material (e.g. a coating layer, an adhesive layer, a secondary backing, or similar). These layers can be used if their purpose is to hide stitches, improve acoustic properties, increase stiffness of the carpet, increase strength of the carpet. Woven carpets are not relevant to the present invention. The term "carpet" can include a tufted carpet.

Carpet in accordance with embodiments of the present invention preferably have a limited number of loose fibers, although, not every fiber needs to be bonded. Loose fibers will reduce stiffness, which is not preferred. Prior to bonding non-woven materials according to embodiments of the present invention having loose fibers can be structured. Some of the fibers of nonwovens structures according to embodiments of the present invention are bonded thermally, preferably using a pressureless thermally activate bonding. Bonding can be provided throughout the web.

The term "event or exhibition carpet" preferably comprise entangled and bonded non-woven structures according to embodiments of the present invention for use as floor coverings for single usage in events or exhibitions of limited duration and can have any of the following in embodiments of the present invention:
 a) one visible layer (homogeneous product);
 b) more than one visible layer, the bonding materials of which does not reach the top of the upper wear surface;
 c) more than one visible layer, the bonding materials of which is present throughout its thickness.

For Event Carpet

Preferred Dtex for fibers such as PP fibers: for example 3.3 to 25 dtex, preferably 5.5 to 20, more preferably 7 to 17 dtex.

Weight: 100-350 g/m$^2$; preferably 150-310 g/m$^2$, more preferably 230-275 g/m$^2$ Other products are as follows:

Residential and Contract Carpet

Such a carpet will have a fraction of fine filaments for good coverage, e.g. 17 dtex or lower. This carpet can also include a fraction of thick filaments such as mainly 70 or 110 dtex.

Weight: preferably 100-1000 gsm

The carpet is suitable for domestic use in classes 21 (Moderate), 22 (General) or 23 (Heavy) intensity of use of European standard FprEN 1307:2013.

Example of a Structured Carpet

Dilours: weight up to 450 g/m$^2$ A Dilours carpet often has a latex backing, whereby the weight of the latex has been deducted from the total weight to reach the value of 450 g/m$^2$ Automotive Carpet, Coverings or Linings Fibers: 6.7 to 110 dtex, pref 6.7 to 33 dtex Geotextile Fibers 3.3 dtex to 45 dtex to form a matrix of fibers made of the second material whereas for bonding fibers made of the first material the fibers can be 3.3 dtex to 17 dtex Hygiene Products Preferably made by hydro-entangled webs with a weight range 25 g/m$^2$ up to 350 g/m$^2$, and fiber range 1 dtex to 6 dtex Medical Products For needle-punched bandages and wound care the weight range can be 60 to 300 g/m$^2$ and a fiber range 1.5 dtex tot 17 dtex Filtration Products Preferably the weight range is 60 to 500 g/m$^2$ and a fiber range with the second material being 1.5 dtex to 38 dtex and a range of 1.2 dtex to 25 dtex for bonding fibres having some of the first material.

Thermal Insulation (Clothing and Pipe Wrapping)

Weight range is preferably 60 to 1000 g/m$^2$ and fiber range 1.5 dtex to 17 dtex for fibres of the second material and 1.2 dtex to 6.7 dtex for bonding fibres having the first material.

Acoustic Absorption Products

Preferred weight range is 60 to 500 gsm, and fiber range 1.5 dtex to 38 dtex for fibers with the second material and 1.2 dtex to 6.7 dtex for bonding fibers with the first material.

Acoustic Dampening (Contact Sound) Products

Preferred weight range is 150 to 500 g/m$^2$, and fiber range 3.3 dtex to 25 dtex for fibers with the second material and 3.3 dtex to 13 dtex for fibers having the first material for bonding Linings (Shoe, Luggage, Clothing . . . )

Preferred weight range is 60 to 500 g/m$^2$, and a fiber range of 1.5 dtex to 38 dtex for fibers made with the second material and 1.2 dtex to 6.7 dtex for fibers having the first material for bonding.

The term "trilobal" refers to a fiber cross-section which comprises of three lobes.

The term "Multilobal" refers to a fiber cross-section which comprises of a plurality of lobes.

The "core" of staple fiber can be hollow and can include an axial hole or void, or the core can be of solid material.

The catalyst "metallocene":

Many metallocenes and their derivative are active catalysts for olefin polymerization. Polymeric materials made using a metallocene catalyst include polyolefin polymers, e.g. made using a single-site metallocene catalyst system such as a homogeneously branched ethylene polymer, a substantially linear ethylene interpolymer or a homogeneously branched linear ethylene interpolymer, including a polypropylene polymer.

The polyolfin can be made only with a metallocene catalyst or a combination of a metallocene catalyst and another catalyst, e.g. metallocene and Ziegler-Natta catalysts provided that the melting point is depressed sufficiently to be 10° C. lower than the second material.

Metallocene catalysts defined in WO2012/126973 pages 10 to 13 are incorporated herewith by reference and can be used with any of the embodiments of the present invention. The polypropylene compositions defined in WO2012/126973 pages 7 to 9 are incorporated by reference and can be used with any of the embodiments of the present invention. The fibers defined in WO2012/126973 pages 6 and 7 are incorporated by reference and can be used with any of the embodiments of the present invention.

Test Methods

The following test methods are to be used.

Melting Point

Melting temperatures Tmelt ("melting point") are determined according to ISO 3146, e.g. on a DSC Q2000 instrument by TA Instruments. To erase the thermal history the samples can be first heated to 200° C. and kept at 200° C. for a period of 3 minutes. The reported melting temperatures ("melting points") are then determined with heating and cooling rates of 20° C./min.

Dimensions: CEN/TS 14159

Total thickness mm: ISO 1765 whereby the tolerance is nominally+15%

Total mass per unit area g/m$^2$: ISO 8543 whereby the tolerance is nominally the mass 25+15%

Stiffness:

Sampling

According to Norm NBN EN ISO 9862

Minimum number of samples: 5 in machine direction (MD) and 5 in cross direction (CD)

Width of the samples: 200 mm+0.5 mm

Length of the sample: long enough to allow a gauge length of 100 mm.

Tensile Test

According to EN ISO 13934-1

(sample size deviates from the norm for better accuracy, cfr. 'Sampling'; as well as the gauge length and the rate of extension)

Parameters:

Gauge length=100 mm

Rate of extension=50 mm/min

Pretension=1N

Calculation of Stiffness

Determine the force (F) on samples with a width of 200 mm that was necessary for 0.5% and 1.5% of strain (i).

$$\text{Stiffness}\left[\frac{N}{\%}\right] = \frac{(F_{1.5\%} - F_{0.5\%})}{\Delta\varepsilon}$$

- Force in $N$
- Difference in strain $\Delta\varepsilon = 1\%$

Correction for Weight of the Non-Woven

The stiffness shows a linear relation with the weight of a non-woven.

It is preferred to compare samples with similar weights. e.

The stiffness is corrected for weight by determining a normalized stiffness given by the following normalized to 300 g/m²:

Normalized Stiffness=stiffness×300 gram per square meter divided by the weight of the measured sample in gram per square meter.

The formula for stiffness itself is given above.

DESCRIPTION OF ILLUSTRATIVE EMBODIMENTS

The present invention provides an entangled and bonded non-woven structure that can be used in:

Event/exhibition carpet:
  low cost product for intense use during short lifetime (e.g. for 5 days), due to limited use recycling the materials can be efficient.
  Embodiments of the present invention do not require a backing (while event/exhibition carpet of the prior art typically require a backing for bonding the fibers)

Contract market carpet:
  long lifetime for intense use
  backing, if used, is used to give more weight to provide comfort, or better acoustics. But in embodiments of the present invention, the backing is not used for bonding, and preferably does not affect recycling capability The bonded and entangled non-woven structure according to some embodiments of the present invention can be used for carpets but also in hygiene and health care, such as in disposable or single use products for use, for example in hospitals, schools, and domestically, in diapers or wipes or tissues of any sort. Examples are Residential and contract carpet, structured carpet, Automotive carpet and linings, Geotextile, Hygiene products, Medical products, Filtration products, Thermal insulation (clothing and pipe wrapping), Acoustic absorption (airborne), Acoustic dampening (contact sound) products, Linings (shoe, luggage, clothing.)

Embodiments of the present invention provide an entangled and bonded non-woven structure which can be low in weight but having good abrasion resistance and good coverage. The bonded and entangled non-woven structure can be used as a facing layer for carpets, in some embodiments suitable for short term and temporary applications such as carpets for trade stands at exhibitions, display areas in shops or for occasional floor protection, or in other embodiments for long term use such as for contract carpet or carpet for domestic use. Entangled and bonded non-woven structures of some embodiments comprise polyolefin fibers such as polypropylene fibers, or comprise polyester or polyamide fibers.

The present invention provides in one aspect an entangled and bonded non-woven structure made of at least 50% staple fibers based on the weight of the bonded and entangled non-woven structure, and at least a partial bonding of the fibers of the bonded and entangled non-woven structure, the at least partial bonding comprising thermally activated bonds between a first polyolefin material produced with a catalyst of which one is a metallocene catalyst and having a melting point in the range of 130-170° C. (or 130-155° C.) and a second material having a melting point which is at least 10° C. higher than the melting point of the first material, the weight of the first material in the bonded and entangled non-woven structure being at least 3% of the weight of the bonded and entangled nonwoven structure. The second material can have a melting point of 160-165° C. for example. The staple fibers can be solid or hollow or a mixture of the two or can have any suitable cross-sectional shape.

The catalyst for first polyolefin material can be a metallocene catalyst alone or a combination of a metallocene catalyst with another, e.g. a combination of a Ziegler Natta catalyst and a metallocene catalyst or can be a mixture of materials each one made by either a Ziegler Natta catalyst or a metallocene catalyst.

FIG. 1 shows a schematic cross-section of a carpet 1 comprising at least a facing layer 2 which is an entangled and bonding non-woven structure such as a needle punched layer. The carpet according to some embodiments of the present invention can comprise only the facing layer 2 bonded by a bonding material within the facing layer. The carpet can include an optional backing layer 3, but it is preferred if this backing layer 3 can be easily removed if it is made of polymer materials not compatible with recycling of the carpet.

Figure 3:
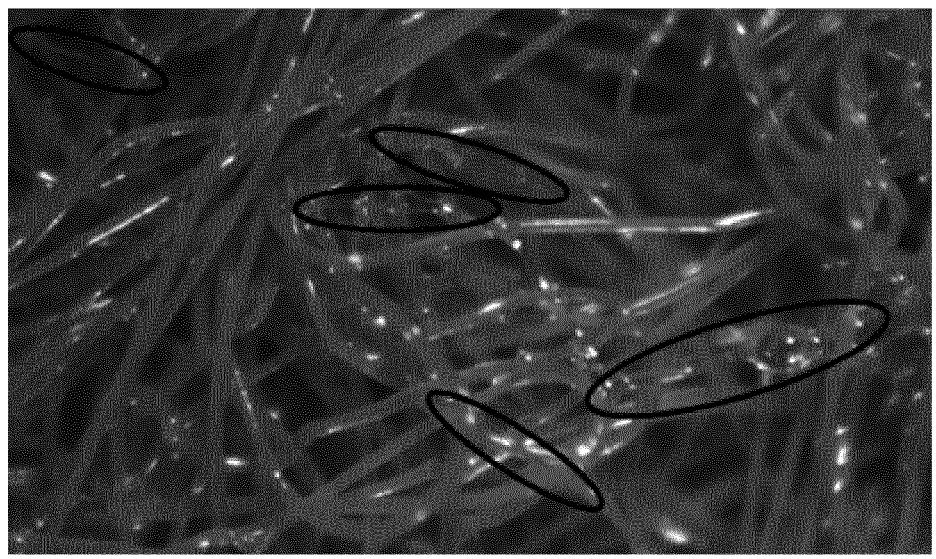
FIG. 3 shows an entanglement of fibers as can be produced by embodiments of the present invention.

As shown in FIG. 3, the bonding between fibers gives the bonded and entangled non-woven structure a mechanical stability. Embodiments of the present invention include a combination of the needle punched facing layer 2 according to embodiments of the present invention with an at least a partial thermally activated pressureless bonding between fibers which are located in the needle punched facing layer 2. This bonding is preferably activated by heat alone, e.g. in an oven which is run at a temperature that is lower by at least 5° C. than the melting point of second material and without pressure when hot. The time should be set in the oven so that the bonding fibers (having the first material made with a metallocene catalyst) or bicomponent fibers (having both first and second materials) form bonds but these fibers or any other fiber do not completely melt away as keeping the integrity of the fibers or keeping them intact gives a stronger non-woven with a higher modulus/stiffness. The time in the oven is usually one or a few minutes. Infrared heating, or hot air can also be used alone or in combination with an air circulating oven. It is preferred that at least 50%, more preferably at least 60%, still more preferred if at least 75% of the fibers maintain their integrity after thermally activated bonding.

Alternatively, one or more backing layers 3 can be applied such as a porous backing layer or a single backing layer, provided the backing can be recycled with other components in the carpet or the backing can be stripped off easily in recycling, e.g. that the penetration is low. The backing 3 may comprise one or more layers such as for instance a latex layer, thermoplastic film layer, a thermoplastic extrusion layer, a foam layer or felt layer such as a needle felt layer. For example an adhesive layer 4 can be used to bind the needle punch facing layer 2 to other layers. A combination of these layers can be assembled, e.g. by needle punching, by lamination, or adhering layer together. Such a multilayer backing can be formed to improve coverage or to enhance acoustic properties.

In the bonded and entangled non-woven structure the staple fiber content of the facing layer can be at least 60%, 70, 80 or 90% by weight of the total fiber content, preferably up to 100% by weight of the total fiber content of the facing layer.

A bonded and entangled non-woven structure as used in some embodiments of the present invention is a staple fiber based needlepunched nonwoven structure which is subsequently provided with a binding by internal thermally activated pressureless bonding. Optionally a backing can be used.

In a preferred embodiments the weight of the bonded and entangled non-woven structure for use as a top or facing layer (base weight) for a carpet is between 100 and 350 grams per square meter, for example between 150-275 grams per square meter. Fiber linear mass density and weights for a complete list of products are given in the definition section.

A process for making a carpet according to embodiments of the present invention is based on the use of staple fibers typically received as bales that undergo a preliminary treatment in a "bale-breaker" for homogenising the batch by grading it according to the colour and to the fiber type (denier, length, crimp, composition). The fibers can be made, preferably, of polypropylene, polyamide or polyester. A first rough opening of the fiber staples, compacted by the being inside the bales, is implemented in a carding willow.

The staple fibers are blended, e.g. blown and mixed in one or more storage chambers to form homogenised fibers. Homogenised fibers are sent to a carding machine comprising: a feeder for receiving the fibers and laying it homogeneously, in the shape of a mat on a conveyor. The carding machine is formed by a series of toothed cylinders of various diameters providing the fiber paralleling and the laying of the same onto a conveyor as a light and homogeneous card web. The fibrous web may be conveyed to a crosslapping machine so as to crosslap the card web into a batt of material. The number of layers or laps which constitute the batt determines the desired weight of the non-woven layer. A lap roller receives the card web and lays it as a multilayer onto a conveyor that feeds a needlepunching apparatus. Needlepunching is carried out by means of the action of a plurality of needles, moving orthogonally to the fiber mat feed in a reciprocating motion, that seize the fibers and drag them through the fiber mass, binding and compacting. The non-woven structure can be structured before needlepunching or before heat treatment. Finally the fibers are activated by heat and bonded without use of pressure when the non-woven structure is hot. The non-woven material is then placed in an air circulating oven to thermally activate the first material to cause fiber-to-fiber bonds. Typically the oven temperature will be at least 5° below the melting point of the first material. The time in the oven is selected to causes the second material in one fiber to bond to another fiber without complete melting of any fiber. This is typically a time of one to a few minutes.

One or more backing layers can be applied on the underside but this is less preferred.

Embodiment 1 (Bicomponent Fibers)

This embodiment provides an entangled and bonded non-woven structure which relies on the use of staple fibers of which some or all are bicomponent fibers. A bicomponent fiber can be made of the second material such as a polyolefin, e.g. polypropylene, whereby on the surface of the bicomponent fibers there is exposed a first material different from the second material. There is a difference in melting point between the first material and the second material. For example the second material can be a conventional PP having a melting point of 160-165° C., while the first material is, for example a specific polyolefin. The first material is preferably a polyolefin, e.g. polypropylene produced with one or more catalysts wherein one of the catalysts is a metallocene catalyst. The melting point of the first material is selected to be lower than the second material, e.g. at least 10° C. lower. For example the melting point of the first material can be in the range of 130-170° C. (or 130-155° C.). The bicomponent fiber can have a sheath of the first material and a core of the second material.

The bicomponent fibers are bonded to each other, an optionally to other fibers, by a thermal pressureless bonding process. An entangled non-woven structure is made as described above with the bicomponent fibers and the structure is placed in an oven and heated without pressure at a temperature at least 5° C. below the melting point of the second material.

The bicomponent fibers can be constructed in a variety of ways, e.g. each half of the fiber is made of the second material, the other half being the first material material, alternate sectors of the bicomponent fiber are made of the first or second material, a multicore is made of the second material set in a matrix of the first material, strips of first material may be formed along a fiber made of the second material, a fiber made of the second material can be segmented with layers of the first material, etc.

Figure 2:
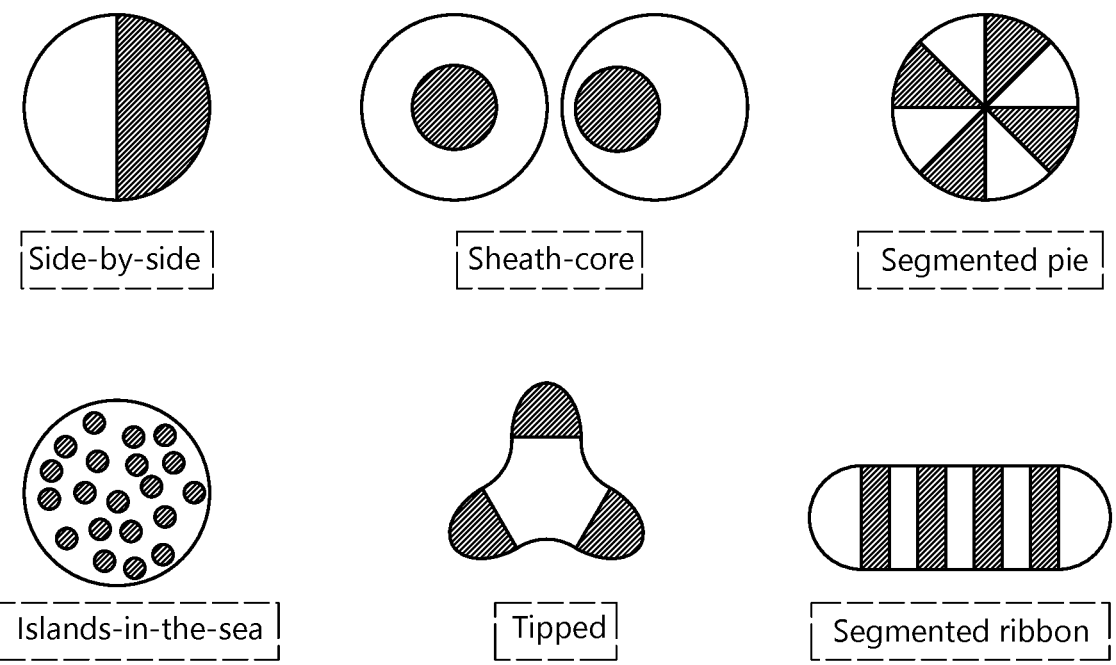
FIG. 2 shows various types of bicomponent fibres designs that can be used with embodiments of the present invention.

Some examples are shown in FIG. 2 but possibilities are not limited to the designs shown in FIG. 2.

In a process according to an embodiment of the present invention: First an entangled non-woven structure is made such as a needlefelt.

The fibers of this entangled non-woven structure such as a needlefelt can comprise 100% of the bicomponent fibers mentioned above.

Alternatively the fibers of this entangled non-woven structure such as the needlefelt can comprise mix of these bicomponent fibers with other types of fibers.

In a second step, the entangled non-woven structure such as the needlefelt is bonded by passing it through an oven or equivalent heating device. The temperature profile of the oven or alternative device is chosen in such a way that the first material of the bicomponent fibres at least partially melts and bonds to an adjacent fiber while the second material does not melt and/or the bicomponent fibers keep their integrity or their original form.

For example, the temperature profile of the oven or alternative device is such that it is 5° C. below the melting point of the second material. In this way, a material is produced which is bonded without losing all of its softness/carpet feeling. It is preferred that at least 50%, more preferably at least 60%, still more preferred if at least 75% of the fibers maintain their integrity after thermally activated bonding.

Comparison with Other Bonding Methods:

This choice of polymer in this embodiment in combination with the bonding process has the following advantages over existing bonding methods:

Comparison with latex bonding:
Materials that consist 100% of one thermoplastic polymeric material or comprise a mixture of polyolefins can be recycled s. Latex is not recycleable though. As a result, needlefelt carpet that is bonded with latex can no longer be recycled at a reasonable cost.

The bonded and entangled non-woven structure of this embodiment, e.g. when used as a carpet comprises 100% of one or more polyolfins. As a result, the carpet is 100% recyclable.

Low temperature melting fibers (melt temperature below 130° C.)

Bonding strength much lower than with other bonding methods. The stiffness of a carpet is a very good indication for the bonding strength (for stiffness test see definition section).

For a needlefelt carpet (e.g. with a weight of 300 g/m²), the stiffness should be at least 150 N/% to be certain that the bonding strength is sufficient.

Nominal values of normalized stiffness for different bonding methods:
(each time for a carpet of 300 g/m²)
Latex bonding—50 g/m² latex (dry weight): 180-200 N/%
Powder bonding—40 g/m² PO powder: 140-160 N/%
Low temperature melt fibre—50 g/m² fibres: 100-120 N/%

Embodiment 2

This embodiment provides an entangled non-woven structure which relies on the use of staple fibers. A first staple fiber is made of a second material such as a polyolefin, e.g. polypropylene, and a first staple fiber is made of a first material such as a polyolefin, e.g. polypropylene. There is a difference in melting point between the first and second materials. For example the second material can be conventional PP having a melting point of 160-165° C., while the first material is, for example a specific polyolefin. The first material is preferably a polyolefin, e.g. polypropylene produced with one or more catalysts wherein one of the catalysts is a metallocene catalyst. The melting point of the first material is selected to be lower than the second material, e.g. at least 10° C. lower. For example the melting point of the first material can be in the range of 130-170° C. (or 130-155° C.).

The first fibers are bonded to the second fibers by a thermal pressureless bonding process. An entangled non-woven structure is made as described above the structure is placed in an oven and heated without pressure at a temperature at least 5° C. below the melting point of the second material.

In a first step, a mix is made of first (bonding) fibers and second fibers made of regular PP fibers (melting point 160-165° C.). The amount of bonding fibers necessary is between 3 and 30% by weight of the total weight of the non-woven structure, preferably between 10 and 20%, more preferably 15%. The non-woven structure is then entangled, e.g. by needling or by hydro-entanglement. The entangled non-woven structure is bonded by passing it through an oven. The temperature profile of the oven is chosen in such a way that the first fiber, i.e. the bonding fiber can at least partially melt while the second fibers which are conventional PP-fibers keep their integrity or their original form. The temperature in the oven can be set to 5° C. below the melting point of the second fibers. It is preferred that at least 50%, more preferably at least 60%, still more preferred if at least 75% of the fibers maintain their integrity after thermally activated bonding. This entangled and bonded non-woven structure is then used for the production of a needlefelt carpet, for example. In this way, a bonded entangled non-woven structure is formed which is sufficiently bonded without losing all of its softness/carpet feeling.

Embodiment 3

Fiber Production:

Bicomponent fibers of sheath/core type with the core made of polypropylene (Polychim, PP HB12XF polypropylene with a melting point of 160° C. according to ISO 3146) and a sheath of polypropylene-based copolymer made with a metallocene catalyst (Total, Lumicene® MR10MX0 with a melting point of 140° C. according to ISO 3146). Two types of fibers were produced:
Type 1: 70% by weight in the core—30% by weight in the sheath
Type 2: 80% by weight in the core—20% by weight in the sheath Properties of the fibres produced are given below.

|  | Ratio | Thickness | Tenacity | Elogation |
|---|---|---|---|---|
| Type 1 | 70/30 | 5.2 dtex | 32 cN/tex | 154% |
| Type 2 | 80/20 | 5.2 dtex | 32 cN/tex | 161% |

(Measurement of dtex according to ISO 1973)

Needlefelt

An event carpet was made of a needle punched nonwoven structure, which was made entirely out of bicomponent fibers. Thermal bonding was performed at an oven temperature of 145° C. (preferably by a thermal pressureless bonding process).

Needle punched nonwoven structure with Type 1 fibres tested for stiffness:

| 70/30 | Weight (g/m²) | Thickness (mm) | Normalized Stiffness |
|---|---|---|---|
| CD | 236.2 | 2.05 | 251.5 |
| MD | 237.0 | 1.94 | 196.2 |
| Average | 236.6 | 2.00 | 223.8 |

Needle punched nonwoven structure Type 2 fibres:

| 80/20 | Weight (g/m²) | Thickness (mm) | Normalized Stiffness N/% |
|---|---|---|---|
| CD | 232.6 | 2.33 | 230.8 |
| MD | 233.1 | 2.08 | 209.8 |
| Average | 232.9 | 2.20 | 220.3 |

The two carpets showed good results for normalized stiffness (above 150 N/%) and also showed very good results on a Taber abrasion test (expert scoring). The following tests were performed:
Standard test with 200 cycles: score 5/5
Modified test to 1000 cycles: score 4.5/5
Details of Taber test:
Weight per arm: 250 g (arm itself)+500 g additional weight
Type abrading wheels: Type CS-0 Rubber
(see http://www.taberindustries.com/taber-abrading-wheels)

Comparison with Other Bonding Methods:

As explained above a needlefelt carpet that is bonded with latex can no longer be recycled.

A carpet made using a bonded entangled non-woven structure according to this embodiment can comprise 100% of polyolefins. As a result, the carpet is 100% recycleable. As explained above the bonding strength better than with other bonding methods.

The stiffness of a bonded entangled non-woven structure in a carpet is an indication for the bonding strength.

This stiffness is measured during a tensile test (see definitions section).

For a needlefelt carpet with a weight of 300 g/m$^2$, the normalized stiffness should be at least 150 N/% to be certain that the bonding strength is sufficient.

Nominal values of normalized stiffness for different bonding methods:
(each time for a carpet of 300 g/m$^2$)
Latex bonding—50 g/m$^2$ latex (dry weight): 180-200 N/%
Powder bonding—40 g/m$^2$ PO powder: 140-160 N/%
Low temperature melt fiber—50 g/m$^2$ fibers: 100-120 N/%
PO melt fiber—50 g/m$^2$ PO fibers: 190-210 N/%

The bonding strength for low temperature melt fibers (below 130° C.) is much lower than the needed 150 N/%. Bonding strength with Latex, powder or PO melt fiber is sufficient. No need for higher amount of bonding material; as this would only increase price.

Results with the new PO melt fiber (comprising first material made with at least a metallocene catalyst) are superior to those with PE melt fiber. This could be caused by a better compatibility between the PO and the PP fibers according to embodiments of the present invention (e.g. similar surface tension).

For example, an event carpet made of a needle punched nonwoven structure.

The nonwoven structure was made using 250 g/m$^2$ of fibers made of polypropylene (Polychim HB12XF) with a melting point of 160° C. and 50 g/m$^2$ of bonding fibers made of polypropylene-based copolymer made with metallocene catalyst (Lumicene® MR10MX0 with a melting point of 140° C. according to ISO 3146).

The event carpet was made according to a carpet-making process as described hereinbefore. The bonding of the fibers was done by passing the nonwoven structure through an oven for 1.5 minutes. The table shows results of normalized stiffness (see definitions section), obtained at 2 temperatures used in the oven.

| Oven Temperature | CD | MD | Stiffness |
|---|---|---|---|
| 145° C. | 138.6 | 174.1 | 156.4 |
| 150° C. | 192.3 | 224.6 | 208.5 |

It is possible to recycle a PP-carpet bonded with PE fibers. Unfortunately, this recycled material can only be used for low end applications since the compatibility between PP and PE isn't very good.

The compatibility between PP (second material) and the proposed PO melt fibers (comprising first material made with at least a metallocene catalyst) according to embodiments of the present invention is much better. As a result, the recycled material can be used for more demanding applications as well.

Powder Process:

Process is very sensitive to humidity variations of both the environment and the carpets to be treated. Even though the impregnation and bonding are carried out in a room with humidity control, this sensitivity still leads to important fluctuations of the bonding strength.

The bonded and entangled non-woven according to embodiments of the present invention does not suffer from such variations in bonding strength.

Improved Coverage

An additional advantage of the use of PO bonding fibers is an improved coverage of the floor below it.

The additional coverage is a result of the partial melting of the PO fibers during the oven treatment: fibers melt enough to bond to fibers in the non-woven structure at the contact points but retain their fiber shape in the areas between the bonding points: see FIG. 3.

Other bonding methods don't have this advantage:
PE melt fibres: melt completely, molten material goes to the contact points
hardly any extra coverage
Powder bonding: powder is located at the contact points
hardly any extra coverage
Latex: material is mostly located at the contact points+ white color of the latex leads to a discoloration of the carpet.

The invention claimed is:

1. A non-tufted carpet comprising, as a facing layer, an entangled and at least partially bonded non-woven structure made of 100% staple fibers by weight of the entangled and bonded non-woven structure, and at least a partial bonding of the staple fibers of the non-woven structure, the at least partial bonding comprising thermally activated bonds between a first polypropylene or polypropylene copolymer material produced with at least one catalyst being a metallocene catalyst and having a melting point in the range 130-170° C. and a second polypropylene or polypropylene copolymer material having a melting point which is at least 10° C. higher than the melting point of the first material, the weight of the first material in the non-woven structure being at least 3% of the weight of the entangled and at least partially bonded nonwoven structure, wherein the staple fibers consist of a bicomponent fiber, wherein the bicomponent fiber is a sheath/core bicomponent fiber, having the first material as the sheath and the second material as the core, wherein the first and second materials are present in a weight ratio of 20:80 to 30:70.

2. The non-tufted carpet according to claim 1 obtainable by first producing the non-woven structure, wherein the at least partial bonding is by passing the entangled non-woven structure through an oven, the temperature profile of the oven being chosen in such a way that fibers keep their integrity after bonding or keep their form except at bonding points between fibers.

3. The non-tufted carpet according to claim 1 being 100% recyclable.

4. The non-tufted carpet according to claim 1, wherein the non-woven structure has a weight of 100-350 grams per square meter.

5. The non-tufted carpet according to claim 1, the entangled and bonded non-woven structure having a normalized stiffness higher than 150N/%.

6. The non-tufted carpet according to claim 1, comprising a backing layer.

7. The non-tufted carpet according to claim 1, wherein the non-woven structure has a weight of 150-275 grams per square meter.

\* \* \* \* \*